United States Patent
Li

(10) Patent No.: US 6,169,043 B1
(45) Date of Patent: Jan. 2, 2001

(54) POLYURETHANE/POLYACRYLATE DISPERSION COATING FOR AIRBAG FABRICS

(75) Inventor: Shulong Li, Spartanburg, SC (US)

(73) Assignee: Milliken & Company, Spartanburg, SC (US)

( * ) Notice: Under 35 U.S.C. 154(b), the term of this patent shall be extended for 0 days.

(21) Appl. No.: 09/335,258

(22) Filed: Jun. 17, 1999

Related U.S. Application Data

(60) Provisional application No. 60/089,670, filed on Jun. 17, 1998.

(51) Int. Cl.$^7$ .......................... B32B 27/04; B60R 21/22; B60R 21/16
(52) U.S. Cl. ..................... 442/71; 442/188; 280/728.1; 280/730; 425/27; 425/35; 425/43; 493/243; 428/35.7; 428/36.1; 428/36.6; 428/36.7
(58) Field of Search ........................ 428/35.7, 36.1, 428/36.6, 36.7; 442/71, 188; 280/728.1, 730; 425/27, 35, 43; 493/243

(56) References Cited

U.S. PATENT DOCUMENTS

| | | | |
|---|---|---|---|
| 4,489,127 | * 12/1984 | Gutek et al. | 428/266 |
| 5,110,666 | * 5/1992 | Menzel et al. | 428/196 |
| 5,193,847 | * 3/1993 | Nakayama | 280/738 |
| 5,254,621 | * 10/1993 | Inoue et al. | 524/837 |
| 5,258,211 | * 11/1993 | Momii et al. | 428/35.2 |
| 5,524,926 | * 6/1996 | Hirai et al. | 280/743.1 |
| 5,829,837 | * 11/1998 | Fujiki et al. | . |
| 5,944,345 | * 8/1999 | Hirai et al. | 280/743.1 |
| 5,945,185 | * 8/1999 | Hirai et al. | 428/35.2 |
| 6,037,279 | * 6/2000 | Bailey et al. | 280/730.2 |
| 6,073,961 | * 6/2000 | Moriwaki et al. | 428/35.2 |

* cited by examiner

*Primary Examiner*—Terrel Morris
*Assistant Examiner*—Arti R. Singh
(74) *Attorney, Agent, or Firm*—Terry T. Moyer; William S. Parks

(57) ABSTRACT

This invention relates to novel airbag coating compositions comprising a mix of polyurethane and polyacrylate constituents which provides a highly effective low permeability treatment on a target fabric surface. This inventive composition also provides a low-cost alternative to other standard airbag coatings and exhibits excellent aging stability as well. An airbag fabric coated with this inventive composition is also contemplated within this invention.

6 Claims, No Drawings

POLYURETHANE/POLYACRYLATE DISPERSION COATING FOR AIRBAG FABRICS

CROSS-REFERENCE TO RELATED APPLICATIONS

This application is based upon pending U.S. Provisional Application No. 60/089,670, filed Jun. 17, 1998.

FIELD OF THE INVENTION

This invention relates to novel airbag coating compositions comprising a mix of polyurethane and polyacrylate constituents which provides a highly effective low permeability treatment on a target fabric surface. This inventive composition also provides a low-cost alternative to other standard airbag coatings and exhibits excellent aging stability as well. An airbag fabric coated with this inventive composition is also contemplated within this invention.

BACKGROUND OF THE INVENTION

Airbags for motor vehicles are known and have been used for a substantial period of time These devices are installed on the driver and passenger side of automobiles and, in the event of a collision, are rapidly inflated with gas, to act as a barrier between the driver or passenger and the steering wheel or dashboard of the automobile.

Coatings have been applied to fabrics, intended for use in automotive airbags, to resist unwanted permeation of air through the fabric and, to a lesser extent, to protect the fabric from detriment by the hot gases used to inflate the bags. Polychloroprene was the polymer of choice in the early development of this product, but the desire to decrease the folded size of the completed airbag, and the tendency of polychloroprene to degrade, with exposure to heat, to release the components of hydrochloric acid (thereby potentially degrading the fabric component as well as releasing hazardous chemicals), has led to the almost universal acceptance of silicone (polydimethylsiloxane or similar materials) as a more suitable coating. In the quest for the most compact folded size possible, coating levels of polymer have dropped from around 2.5 ounces per square yard of fabric, to levels approaching 0.5 ounces per square yard.

New developments in airbags, particularly newer designs being placed in the sides of the passenger compartment, have introduced the requirement that the bags hold pressure longer under use. This, and the evolution of the lower coating levels of silicone polymer, have begun to highlight the effect that, when a sewn seam is put under stress, a naturally lubricating silicone coating may allow the yarns from which the fabric is constructed to shift. This shifting can lead to leakage of the inflating gas through the new pores formed from the shifting yarns, or, in drastic cases, cause the seam to fail. Since the airbag must retain its integrity during a collision event, in order to sufficiently protect the driver or passenger, there is a great need to provide coatings which provide both effective permeability characteristics and sufficient restriction of yarn shifting for the airbag to function properly, if and when necessary. Therefore, a need exist for a cost-effective, one-layer coating which provides low permeability, resistance to yarn shifting and age resistance over long periods of storage.

DESCRIPTION OF THE INVENTION

Polyurethanes usually have very good flexibility and tensile strength in a wide temperature range. Those properties make them good candidates as an air bag coating material. However, after intensive thermal oxidation and humidity aging exposure, polyurethane coatings (especially at relatively low coating weight) may experience significant changes in their physical properties.

Polyacrylates exhibit excellent good aging properties alone; however, such polymers cannot seal a textile substrate particularly along seams at high air pressure (10–30 Psi) as well as polyurethanes.

It has now been realized that a blend of a polyurethane and a polyacrylate provides a highly effective, strong, coating material with simultaneous excellent aging properties. An airbag coated with such a blend also exhibits very low air permeability at high air pressure before and after aging. This synergistic effect is quite surprising considering the performance of these two components alone on the same fabric. Furthermore, it has been found that other benefits are accorded the user of such a coating composition on airbags and airbag fabrics. These benefits include, and not intended as being limited to the following:

(1) Lower costs for the entire composition than with a polyurethane alone since polyacrylates are significantly less expensive and do not reduce the overall strength of the coating composition upon their introduction in relatively high proportions; and (2) Improvements in flexibility since a similar amount of coating comprising polyurethane alone will produce a relatively stiff fabric. The polyurethane/polyacrylate dispersions, as noted above, retain about the same degree of air permeability and strength as the polyurethane alone while also providing a fabric which is less stiff than the polyurethane coating by itself Generally, the polyurethane constituent may be selected from any well known polyurethane composition which adheres well to fabrics and which exhibits a tensile strength greater than 2,000 psi (preferably greater than 4,000 psi) on the fabric surface and which is compatible with polyacrylates to effectuate a proper stable dispersion of the two components. Such a polyurethane composition, and one potentially preferred polyurethane is available from Stahl USA, Peabody Mass., under the tradename Ru 40–350 (40% solids).

The polyacrylate may be selected from any such polymer which exhibits some degree of compatibility with the target fabric surface and is also compatible with the polyurethane as noted above. Such selected polyacrylate must also either be self-cross-linking or at least cross-linkable upon addition of a proper cross-linking agent (such as melamine formaldehyde or any other standard polyacrylate cross-linking agent). One such self-cross-linking polyacrylate, and thus one potentially preferred polyacrylate, is available from Rohm & Haas, under the tradename Rhoplex® E-358 (60% solids). The polyurethane to polyacrylate ratio should be in an amount of from about 0.1:1 to about 10:1; preferably from about 1:1 to about 8:1; more preferably from about 2:1 to about 5:1; and most preferably at about 2.5:1.

The substrate across which the cross-linked elastomeric resin coatings are applied to form the airbag base fabric in accordance with the present invention is preferably a plain woven fabric formed from yarns comprising polyamide or polyester fibers. Such yarn preferably has a linear density of about 100 denier to about 630 denier. Such yarns are preferably formed from multiple filaments wherein the filaments have linear densities of about 6 denier per filaments or less and most preferably about 4 denier per filament or less. Such substrate fabrics are preferably woven using jacquard looms or possibly through the utilization of fluid jet weaving machines as disclosed in U.S. Pat. Nos. 5,503,197 and 5,421,378 to Bower et al. (incorporated herein by reference). The fabric substrate with applied coating will hereinafter be referred to as an airbag base fabric. Other possible components present within the cross-linked elastomeric resin coating composition are thickeners, antioxidants, flame retardants, coalescent agents, adhesion promoters, and colorants.

It has been theorized, without any intention to be limited thereto, that the polyurethane and polyacrylate constituents of the inventive airbag coating composition may, to some degree, for a single polymerized or cross-linked film or coating through the interaction of the free formaldehyde on the polyacrylate with the free carboxyl on the polyurethane. Furthermore, another non-limiting theory has been developed that these polymers actually form a network with a relatively uniform distribution of constituents throughout the coating. However, most likely, and again, without the intent of being bound to such theory, it appears that the two constituents may not actually bond or copolymerize or cross-link together and thus there may exist discrete "patches" of polyurethane surrounded by areas of polyacrylate alone (or vice-versa) on the target fabric surface. In any event, the inventive airbag coating provides unexpected and beneficial strength properties and aging stability all at an extremely low cost.

In accordance with the potentially preferred practices of the present invention, a water borne microdispersion of the two components is formed through the admixture of the polyurethane and polyacrylate in a mixing vessel with a thickener and a flame retardant to yield a dispersion having a viscosity of about 8000 centipoise or greater. Any well known thickener for polyurethanes and/or polyacrylates may be utilized in this invention. One potentially preferred thickener is marketed under the trade designation NATROSOL™ 250 HHXR by the Aqualon division of Hercules Corporation which is believed to have a place of business at Wilmington, Del. Also, in order to meet Federal Motor Vehicle Safety Standard 302 flame retardant requirements for the automotive industry, a flame retardant is also preferably added to the compounded mix. Any well known airbag flame retardant may be used (including aluminum trihydrate, as merely one example). One potentially preferred flame retardant is DE-83R, 70% Dispersion marketed by Great Lakes Chemical.

Once compounding is complete, the dispersion is preferably scrape-coated across the fabric substrate and dried and cured to form a thin coating. Scrape coating in this sense includes, and is not limited to, knife coating, in particular knife-over-gap table, floating knife, and knife-over-foam pad methods, to name a few different method types.

The final dry weight of the coating is preferably from about 0.6 to about 1.0 ounces per square yard or less and most preferably 0.8 ounces per square yard or less. The resultant base fabric is substantially impermeable to air when measured according to ASTM Test D737, "Air Permeability of Textile Fabrics," standards at about 10 to about 30 psi.

As previously indicated, the substrate fabric is preferably a woven nylon material. In the most preferred embodiment such substrate fabric will be formed from fibers of nylon 6,6 woven on a jacquard loom. It has been found that such polyamide materials exhibit particularly good adhesion and maintenance of resistance to hydrolysis when used in combination with the coating according to the present invention.

DETAILED DESCRIPTION OF THE INVENTION AND THE PREFERRED EMBODIMENTS

In order to further describe the present invention the following nonlimiting examples are set forth. The polyurethane/polyacrylate dispersion (coating composition) discussed above and described in more detail below is the most preferred embodiment of the invention. These examples are provided for the sole purpose of illustrating some preferred embodiments of the invention and are not to be construed as limiting the scope of the invention in any manner.

EXAMPLE 1

Synergistic Mixture of Polyurethane and Polyacrylate

| Synergistic Mixture of Polyurethane and Polyacrylate | |
| --- | --- |
| Component | Amount |
| Ru 40-350 (40% solids) | 150 gram |
| Rhoplex E-358 (60% solids) | 60 gram |
| DE-83R, 70% Dispersion | 30 gram |
| Natrosol 250 HHXR | 1.6 gram |

EXAMPLE 2 (Comparative)

Polyurethane only

| Polyurethane only | |
| --- | --- |
| Component | Amount |
| Ru 40-350 (40% solids) | 200 gram |
| DE-83R, 70% dispersion | 10 gram |
| Natrosol 250 HHXR | 1.6 gram |

EXAMPLE 3 (Comparative)

Polyacrylate only

| Polyacrylate only | |
| --- | --- |
| Component | Amount |
| Rhoplex E-358 (60% solids) | 100 gram |
| Water | 50 gram |
| DE-83R, 70% dispersion | 25 gram |
| Natrosol 250 HHXR | 1.8 gram |

These formulations were then applied as coatings on identical samples of Jacquard 2-layer nylon 6,6 woven air bag fabric containing numerous woven seams between layers. Each mix was coated on the air bag fabric using a knife-over-foam pad coater and dried at 350° F. for 3 min. Both sides of the fabric were coated the same way at a coating weight of approximately 0.8 oz/yd$^2$ per side. Air leakage was then measured at 9 Psi air pressure before and after aging. The results are as set forth in the TABLE below.

TABLE

| Example # | Leakage (SCFH)* | |
|---|---|---|
| | Before Aging | After Aging** |
| 1 | 15 | 35 |
| 2 | 12.5 | >70 |
| 3 | >70 | >70 |

*SCFH - standard cubic feet per hour.

**Aging condition: oven aging at 150° C. for 42 hours.

There are, of course, many alternative embodiments and modifications of the present invention which are intended to be included within the spirit and scope of the following claims

What I claim is:

1. An airbag comprising a fabric having a coating applied on at least a portion thereof, wherein said coating comprises a dispersion of at least one polyurethane and at least one polyacrylate.

2. The airbag fabric of claim 1 wherein the ratio of said polyurethane to said polyacrylate in said dispersion is from about 0.1:1 to about 10:1.

3. The airbag fabric of claim 2 wherein the ratio of said polyurethane to said polyacrylate in said dispersion is from about 1:1 to about 8:1.

4. The airbag fabric of claim 3 wherein the ratio of said polyurethane to said polyacrylate in said dispersion is from about 2:1 to about 5:1.

5. The airbag fabric of claim 4 wherein the ratio of said polyurethane to said polyacrylate in said dispersion is about 2.5:1.

6. The airbag fabric of claim 1 wherein said dispersion further comprises at least one thickener and at least one flame retardant.

* * * * *